(12) United States Patent
Suzuki

(10) Patent No.: US 7,732,097 B2
(45) Date of Patent: Jun. 8, 2010

(54) BATTERY

(75) Inventor: Kenichi Suzuki, Fukushima (JP)

(73) Assignee: Sony Corporation, Tokyo (JP)

( * ) Notice: Subject to any disclaimer, the term of this patent is extended or adjusted under 35 U.S.C. 154(b) by 841 days.

(21) Appl. No.: 11/275,958

(22) Filed: Feb. 7, 2006

(65) Prior Publication Data

US 2006/0183024 A1   Aug. 17, 2006

(30) Foreign Application Priority Data

Feb. 17, 2005   (JP)   ............ P2005-041156

(51) Int. Cl.
*H01M 4/58*   (2006.01)
*H01M 6/04*   (2006.01)
*H01M 4/50*   (2006.01)
*H01M 6/16*   (2006.01)

(52) U.S. Cl. ............ 429/231.95; 429/188; 429/224; 429/231.1; 429/231.6; 429/231.8; 429/331

(58) Field of Classification Search ............ 429/231.95, 429/231.1, 224, 231.8, 188, 231.6, 331
See application file for complete search history.

(56) References Cited

U.S. PATENT DOCUMENTS

| | | | | |
|---|---|---|---|---|
| RE33,306 E | * | 8/1990 | Hayashi et al. | 429/336 |
| 5,028,500 A | * | 7/1991 | Fong et al. | 429/224 |
| 5,744,264 A | * | 4/1998 | Barker | 429/223 |
| 6,413,678 B1 | * | 7/2002 | Hamamoto et al. | 429/332 |

FOREIGN PATENT DOCUMENTS

| | | |
|---|---|---|
| JP | 206276 | 7/1992 |
| JP | 07-335261 | 12/1995 |
| JP | 05-144472 | 6/1996 |
| JP | 11-214042 | 8/1999 |
| JP | 2000-235869 | 8/2000 |
| JP | 2001-043859 | 2/2001 |
| JP | 2003-282058 | 10/2003 |
| JP | 2003-331922 | 11/2003 |
| JP | 2004-095399 | * 3/2004 |

OTHER PUBLICATIONS

A Japanese Office Action dated Mar. 19, 2009 issued in connection with counterpart Japanese Patent Application No. 2005-041156.
Office Action dated Aug. 27, 2009 for Japanese Application No. JP-2005-041156.

* cited by examiner

*Primary Examiner*—Patrick Ryan
*Assistant Examiner*—Thomas H. Parsons
(74) *Attorney, Agent, or Firm*—Sonnenschein Nath & Rosenthal LLP

(57) ABSTRACT

A battery capable of improving cycle characteristics is provided. A cathode contains an oxide containing lithium and manganese such as $Li_4Mn_5O_{12}$ as a cathode material. An anode contains a carbon material as and anode material. The weight ratio of the cathode material to the anode material is in the range from 2.03 to 2.53. The electrical capacity ratio of the cathode to the anode is in the range from 0.8 to 1.0. The open circuit voltage in full charge state per a pair of cathode and anode is from 2.9 V to 3.2 V.

12 Claims, 3 Drawing Sheets

BATTERY

CROSS REFERENCES TO RELATED APPLICATIONS

The present invention contains subject matter related to Japanese Patent Application JP 2005-41156 filed in the Japanese Patent Office on Feb. 17, 2005, the entire contents of which being incorporated herein by reference.

BACKGROUND OF THE INVENTION

1. Field of the Invention

The present invention relates to a battery in which the open circuit voltage in full charge state is about 3 V.

2. Description of the Related Art

In recent years, high performance, miniaturization, and portability of electronic devices have been developed as electronic engineering and the like have been advanced. For secondary batteries used as a power source for these electronic devices, high performance and miniaturization have been strongly demanded. As such a secondary battery, for example, lithium ion secondary batteries have been developed and in practical use.

Specially, as a backup power source, the coin-type (button-type) lithium ion secondary battery with a battery voltage of about 3 V using an oxide containing lithium (Li) and manganese (Mn) such as $Li_4Mn_5O_{12}$ for the cathode active material has been widely utilized (for example, refer to Japanese Unexamined Patent Application Publication No. 2004-95399). Such a lithium ion secondary battery provides a high energy density and is lightweight. Therefore, it is considered that such a secondary battery is not only used as a backup power source but also used as a power source for electrical calculators, digital still cameras, portable radios or the like.

SUMMARY OF THE INVENTION

However, there is a disadvantage that the foregoing secondary battery has been mainly used as a backup for memory, and therefore the secondary battery is not suitable for applications demanding a battery life of 100 cycles or more. Therefore, development of a secondary battery with a battery voltage of about 3 V and superior cycle characteristics has been aspired.

In view of the foregoing, in the present invention, it is desirable to provide a battery with superior cycle characteristics.

According to an embodiment of the present invention, there is provided a battery including a cathode, an anode, and an electrolyte in which the open circuit voltage in full charge state per a pair of cathode and anode is in the range from 2.9 V to 3.2 V, the cathode contains a cathode material inserting and extracting lithium, the anode contains an anode material inserting and extracting lithium, and the weight ratio of the cathode material to the anode material (cathode material/anode material) is in the range from 2.03 to 2.53.

According to another embodiment of the present invention, there is provided another battery including a cathode, an anode, and an electrolyte in which the open circuit voltage in full charge state per a pair of cathode and anode is in the range from 2.9 V to 3.2 V, the cathode contains a cathode material inserting and extracting lithium, the anode contains an anode material inserting and extracting lithium, and the electrical capacity ratio of the cathode to the anode (cathode/anode) is in the range from 0.8 to 1.0.

According to the battery of the embodiment of the present invention, the weight ratio of the cathode material to the anode material is in the range from 2.03 to 2.53, or the electrical capacity ratio of the cathode to the anode is in the range from 0.8 to 1.0. Therefore, the capacity and the cycle characteristics can be improved.

Further, when metallic lithium is incorporated in the battery, and the weight ratio of metallic lithium to the anode material (metallic lithium/anode material) is in the range from 0.058 to 0.11 or the electrical capacity ratio of the metallic lithium to the anode (metallic lithium/anode) is in the range from 0.67 to 1.3, higher effect can be obtained.

Further, when the electrolyte contains lithium perchlorate in the range from 0.6 mol/l to 1.5 mol/l, the low temperature characteristics can be improved.

Furthermore, when the electrolyte contains vinylene carbonate in the range of 1.5 wt % or less, the capacity and the cycle characteristics can be further improved.

Other and further objects, features and advantages of the invention will appear more fully from the following description.

DETAILED DESCRIPTION OF THE PREFERRED EMBODIMENT

An embodiment of the present invention will be hereinafter described in detail with reference to the drawings.

Figure 1:
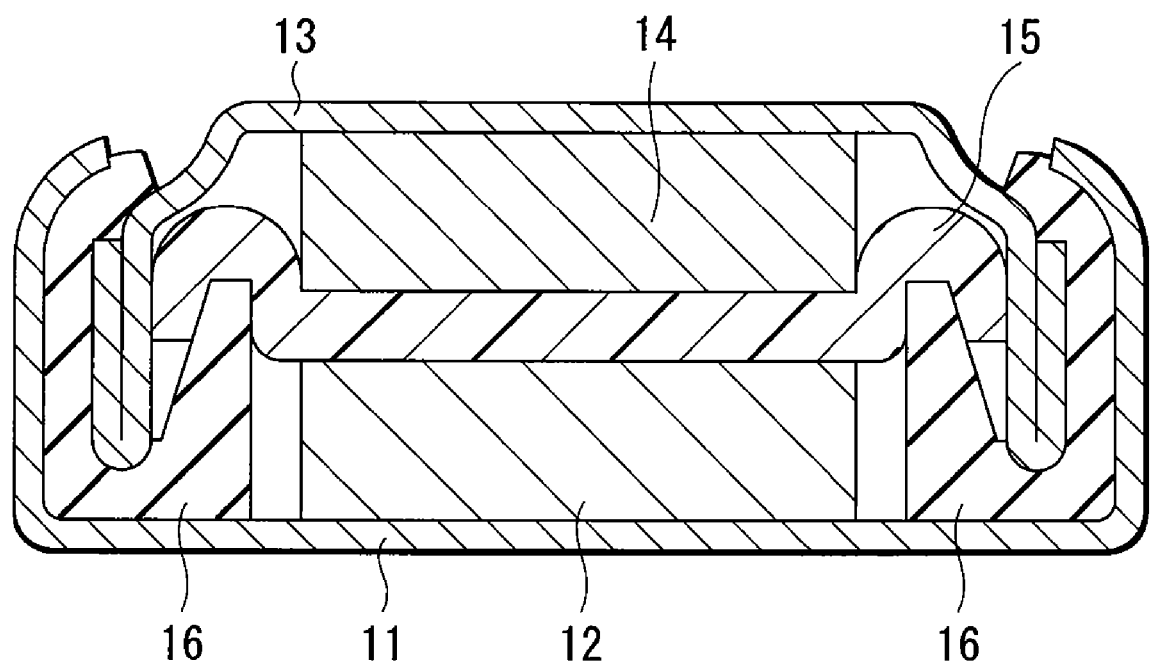
FIG. 1 is a cross section showing a structure of a secondary battery according to an embodiment of the present invention.

FIG. 1 shows a cross section structure of a secondary battery according to an embodiment of the present invention. The secondary battery is a so-called coin-type, and a discoid cathode 12 contained in a cathode can 11 and a discoid anode 14 contained in an anode can 13 are layered with a separator 15 in between. In the secondary battery, the open circuit voltage in full charge state per a pair of cathode and anode is in the range from 2.9 V to 3.2 V. An electrolytic solution, which is a liquid electrolyte, is impregnated in the separator 15. Peripheral edges of the cathode can 11 and the anode can 13 are hermetically sealed by being caulked through a gasket 16. The cathode can 11 and the anode can 13 are respectively made of a metal such as stainless and aluminum (Al), and function as a current collector.

The cathode 12 contains, for example, as a cathode active material, a cathode material inserting and extracting lithium. The cathode 12 contains an electrical conductor such as carbon black and graphite and a binder such as polyvinylidene fluoride according to needs. As a cathode material inserting and extracting lithium, for example, an oxide containing lithium and manganese can be cited. Specifically, $Li_4Mn_5O_{12}$ or the like can be cited. Though the composition is a composition when the battery is assembled, almost the same composition is also shown when the battery is fully charged. One kind of the cathode materials may be used singly, or several kinds thereof may be used by mixing.

The anode 14 contains, for example, as an anode active material, an anode material inserting and extracting lithium. The anode 14 contains a binder such as polyvinylidene fluoride according to needs. One kind of the anode materials may be used singly, or several kinds thereof may be used by mixing.

As an anode material inserting and extracting lithium, a carbon material inserting and extracting lithium can be cited. Specifically, non-graphitizable carbon, graphitizable carbon, graphites, pyrolytic carbons, cokes, glassy carbons, an organic high molecular weight compound fired body, activated carbon, and carbon black or the like can be used. Of the foregoing, cokes include pitch cokes, needle cokes, petroleum cokes and the like. The organic high molecular weight compound fired body is obtained by firing and carbonizing a high molecular weight compound such as a phenol resin and a furan resin at appropriate temperatures. One of the carbon materials capable of inserting and extracting lithium may be used singly, or several kinds thereof may be used by mixing.

Further, the anode 14 has inserted lithium before the initial charge and discharge, and has been in the charged state. Such lithium is, for example, provided from metallic lithium bonded to the anode can 14 when the battery is assembled. Metallic lithium may be incorporated in any location inside the battery as long as lithium can be inserted into the anode 14. Further, in some cases, metallic lithium is not inserted in the anode 14, but remains.

The weight ratio of the cathode material to the anode material is preferably in the range from 2.03 to 2.53. Further, the electrical capacity ratio of the cathode 12 to the anode 14 is preferably in the range from 0.8 to 1.0. In such ranges, the capacity and the cycle characteristics can be improved.

Further, the weight ratio of metallic lithium incorporated inside the battery in assembling to the anode material is preferably in the range from 0.058 to 0.11, more preferably in the range from 0.07 to 0.10, much more preferably in the range from 0.073 to 0.098. Further, the electrical capacity ratio of metallic lithium to the anode 14 is preferably in the range from 0.67 to 1.3, more preferably in the range from 0.8 to 1.2, and much more preferably in the range from 0.86 to 1.15. In such ranges, the capacity is inhibited from being lowered, and the cycle characteristics can be more improved.

The electrical capacity of the cathode 12 means, for example, an electrical charge when electricity is conducted from 3.0 V to 2.0 V using metallic lithium as a counter electrode. The electrical capacity of the anode 14 means, for example, an electrical charge when electricity is conducted from 0 V to 1.5 V using metallic lithium as a counter electrode.

The separator 15 separates the anode 14 from the cathode 12, prevents current short circuit due to contact of the both electrodes, and lets through lithium ions. The separator 15 is made of, for example, a synthetic resin porous film made of polytetrafluoroethylene, polypropylene, polyethylene or the like, or a porous film made of an inorganic material such as ceramics nonwoven cloth. The separator 15 may have a structure in which two or more of the foregoing porous films are layered.

The electrolytic solution is a solution in which an electrolyte salt is dissolved in a solvent. The electrolytic solution shows ion conductivity due to ionization of the electrolyte salt.

As a solvent, for example, ethylene carbonate, propylene carbonate, γ-butyrolactone, sulfolane, methyl sulfolane, diethyl carbonate, dimethyl carbonate, methyl ethyl carbonate and the like can be cited. One of the solvents may be used singly, or two or more thereof may be used by mixing.

In addition, the solvent preferably contains vinylene carbonate. Thereby, decomposition reaction of the solvent in the anode 14 can be inhibited, and the capacity and the cycle characteristics can be further improved. The content of vinylene carbonate is preferably 1.5 wt % or less to the whole electrolytic solution. In such a range, high effect can be obtained.

As an electrolyte salt, for example, lithium phosphate hexafluoride ($LiPF_6$), lithium perchlorate ($LiClO_4$), lithium arsenate hexafluoride ($LiAsF_6$), lithium boron tetrafluoride ($LiBF_4$), trifluoro methane lithium sulfonate ($LiCF_3SO_3$), or bis(trifluoro methane sulfonyl)imido lithium ($LiN(CF_3SO_2)_2$) can be cited. Specially, lithium perchlorate is preferable since the low temperature characteristics can be thereby improved. The concentration of lithium perchlorate is preferably in the range from 0.6 mol/l to 1.5 mol/l, and more preferably in the range from 1.0 mol/l to 1.5 mol/l. In such ranges, high effect can be obtained. One kind of the solvents may be used singly, or two or more thereof may be used by mixing.

The secondary battery can be manufactured, for example, as follows.

First, for example, a cathode mixture is prepared by mixing a cathode active material, and if necessary, an electrical conductor and a binder. The cathode mixture is compression-molded to form the cathode 12.

Further, for example, an anode mixture is prepared by mixing an anode active material, and if necessary, a binder. The anode mixture is compression-molded to form the anode 14. Then, the injection amounts of the cathode active material and the anode active material are adjusted.

Subsequently, metallic lithium is bonded to the central part of the anode can 13. Further, on the metallic lithium, the anode 14 and the separator 15 are laid in this order. An electrolytic solution is injected over the separator 15. The cathode can 11 containing the cathode 12 is overlaid thereon, and the anode can 13 and the cathode can 11 are caulked through the gasket 16. Then, the amount of metallic lithium is adjusted. Thereby, the secondary battery shown in FIG. 1 is formed.

In the secondary battery, first, when discharged, for example, lithium ions are extracted from the anode 14 and inserted in the cathode 12 through the electrolytic solution. Subsequently, when charged, for example, lithium ions are extracted from the cathode 12 and inserted in the anode 14 through the electrolytic solution. Then, since the weight ratio of the cathode material to the anode material or the electrical capacity ratio of the cathode 12 to the anode 14 is in the foregoing range, the capacity and the cycle characteristics are improved.

As above, according to this embodiment, since the weight ratio of the cathode material to the anode material is in the range from 2.03 to 2.53, or the electrical capacity ratio of the cathode 12 to the anode 14 is in the range from 0.8 to 1.0, the capacity and the cycle characteristics can be improved.

Further, when the battery is formed by incorporating metallic lithium, and the weight ratio of metallic lithium to the anode material is in the range from 0.058 to 0.11, or the electrical capacity ratio of metallic lithium to the anode 14 is in the range from 0.67 to 1.3, higher effects can be obtained.

Further, when the electrolytic solution contains lithium perchlorate in the range from 0.6 mol/l to 1.5 mol/l, the low temperature characteristics can be improved.

Furthermore, when the electrolytic solution contains vinylene carbonate in the range of 1.5 wt % or less, the capacity and the cycle characteristics can be further improved.

EXAMPLES

Further, specific examples of the present invention will be hereinafter described in detail.

Examples 1-1 to 1-5, 2-1 to 2-5, 3-1, and 3-2

First, $Li_4Mn_5O_{12}$ as a cathode material, artificial graphite as an electrical conductor, and polyvinylidene fluoride as a binder were mixed at a weight ratio of $Li_4Mn_5O_{12}$:artificial graphite:polyvinylidene fluoride=90:7:3 to prepare a cathode mixture. The cathode mixture was compression-molded to form the discoid cathode 12 being 12.2 mm in external diameter Φ and 0.6 mm thick.

Further, artificial graphite as an anode material and polyvinylidene fluoride as a binder were mixed at a weight ratio of artificial graphite:polyvinylidene fluoride=96:4 to prepare an anode mixture. The anode mixture was compression-molded to form the discoid anode 14 being 13.0 mm in external diameter Φ and 0.25 mm thick. Then, the injection amounts of the cathode material and the anode material were adjusted so that the weight ratio of the cathode material to the anode material was 2.03 in Examples 1-1 to 1-5, 2.33 in Examples 2-1 to 2-5, and 2.53 in Examples 3-1 and 3-2.

Subsequently, a lithium metal foil, which was punched out in a discoid shape being 11.0 mm in external diameter Φ and 0.10 mm thick was bonded inside the anode can 13 made of stainless. On the lithium metal foil, the anode 14 and the separator 15 made of polypropylene being 150 μm thick were laid in this order, and an electrolytic solution was injected therein. Then, the amount of the lithium metal foil was adjusted so that the weight ratio of metallic lithium to the anode material was in the range from 0.058 to 0.110 as shown in Table 1.

Next, the cathode 12 was laid on the separator 15, into which the electrolytic solution was further injected. After that, the cathode can 11 was overlaid, and the anode can 13 and the cathode can 11 were caulked through the gasket 16 made of polypropylene to fabricate a coin-type secondary battery being 16.0 mm in external diameter Φ and 1.6 mm thick. As the electrolytic solution, an electrolytic solution in which lithium perchlorate ($LiClO_4$) as an electrolyte salt was dissolved in a mixed solvent of ethylene carbonate, dimethyl carbonate, and methyl ethyl carbonate was used. Then, the mixing ratio (volume ratio) of ethylene carbonate, dimethyl carbonate, and methyl ethyl carbonate was ethylene carbonate:dimethyl carbonate:methyl ethyl carbonate=18:72:10. Further, the concentration of lithium perchlorate in the electrolytic solution was 1.4 mol/l.

For the fabricated secondary batteries of Examples 1-1 to 1-5, 2-1 to 2-5, 3-1, and 3-2, charge and discharge test was performed to examine the initial discharge capacity and the deterioration amount of the discharge capacity. Charge and discharge were performed as follows. First, constant current discharge was performed at 23 deg C. until the battery voltage reached 2.0 V at a constant current of 0.5 mA. Next, constant current charge was performed until the battery voltage reached 3.0 V at a constant current of 1 mA. After that, constant voltage charge was performed over 24 hours at 3.0 V. For the discharge capacity deterioration amount, 50 cycles of charge and discharge tests were performed and the average deterioration amount of the discharge capacity per 1 cycle was obtained. The results are shown in Table 2 and FIG. 2. Further, the electrical capacity ratio of the cathode 12 to the anode 14 and the electrical capacity ratio of metallic lithium to the anode 14 are shown together in Table 1 and FIG. 3. In Table 2 and FIGS. 2 and 3, the initial discharge capacity is shown as a relative value where the value of Example 2-5 is 100.

TABLE 1

|  | Cathode material/anode material (weight ratio) | Cathode/anode (electrical capacity ratio) | Metallic lithium/anode material (weight ratio) | Metallic lithium/anode (electrical capacity ratio) |
| --- | --- | --- | --- | --- |
| Example 1-1 | 2.03 | 0.80 | 0.058 | 0.672 |
| Example 1-2 |  |  | 0.073 | 0.863 |
| Example 1-3 |  |  | 0.085 | 1.000 |
| Example 1-4 |  |  | 0.098 | 1.150 |
| Example 1-5 |  |  | 0.110 | 1.300 |
| Example 2-1 | 2.33 | 0.92 | 0.058 | 0.672 |
| Example 2-2 |  |  | 0.074 | 0.872 |
| Example 2-3 |  |  | 0.085 | 1.000 |
| Example 2-4 |  |  | 0.098 | 1.150 |
| Example 2-5 |  |  | 0.110 | 1.300 |
| Example 3-1 | 2.53 | 1.00 | 0.088 | 1.038 |
| Example 3-2 |  |  | 0.098 | 1.150 |

TABLE 2

|  | Initial discharge capacity (relative value) | Discharge capacity deterioration amount (mAh/cycle) |
| --- | --- | --- |
| Example 1-1 | 57.8 | 0.03 |
| Example 1-2 | 76.5 | 0.15 |
| Example 1-3 | 88.2 | 0.34 |
| Example 1-4 | 98.4 | 0.43 |
| Example 1-5 | 97.4 | 0.65 |
| Example 2-1 | 54.8 | 0.05 |
| Example 2-2 | 71.6 | 0.15 |
| Example 2-3 | 82.9 | 0.25 |
| Example 2-4 | 94.7 | 0.33 |
| Example 2-5 | 100.0 | 0.47 |
| Example 3-1 | 80.2 | 0.39 |
| Example 3-2 | 89.2 | 0.47 |

Further, the electrical capacities of the cathode 12 and the anode 14 were examined as follows. First, the foregoing cathode mixture was formed into a discoid shape being 12.2 mm in external diameter Φ and 0.4 mm thick to form the cathode 12. Subsequently, using metallic lithium as a counter electrode, a coin-type secondary battery being 16.0 mm in external diameter Φ and 1.6 mm thick was fabricated. For the secondary battery, discharge was performed until the final voltage reached 2.0 V at a current value of 1 mA. Subsequently, constant current charge was performed until the battery voltage reached 3.0 V at a current value of 1 mA, and then constant voltage charge was performed over 16 hours at 3.0 V After that, discharge was performed until the final voltage reached 2.0 V at a current value of 1 mA, and the electrical charge then was the electrical capacity of the cathode 12.

Further, the foregoing anode mixture was formed into a discoid shape being 13.0 mm in external diameter Φ and 0.25 mm thick to form the anode 14. Subsequently, using metallic lithium as a counter electrode, a coin-type secondary battery being 16.0 mm in external diameter Φ and 1.6 mm thick was fabricated. For the secondary battery, charge was performed until the final voltage reached 0 V at a current value of 0.1 mA. After that, discharge was performed until the battery voltage reached 1.5 V at a current value of 0.1 mA, and the electrical charge then was the electrical capacity of the anode 14.

Figure 2:
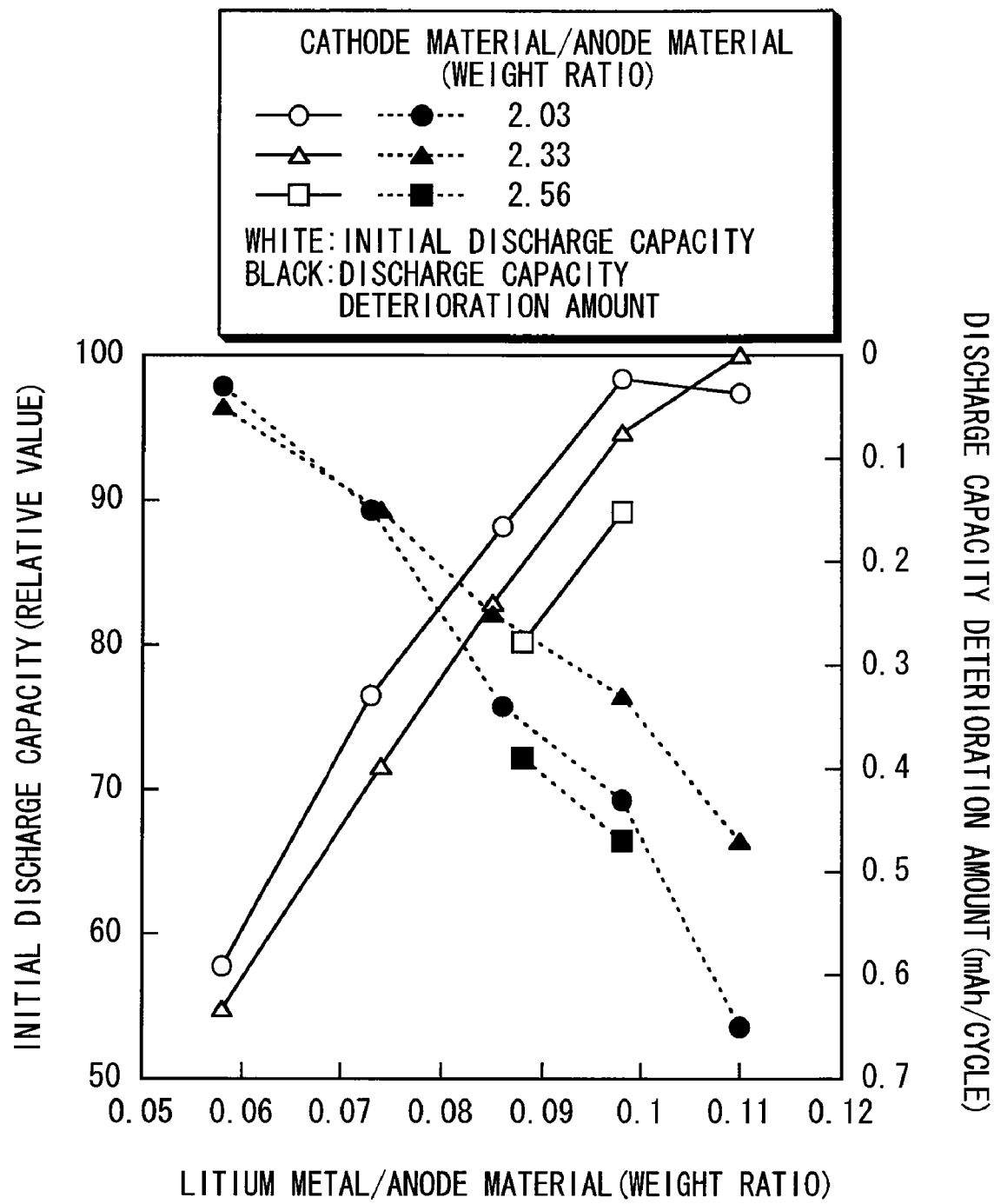
FIG. 2 is a characteristics view showing a relation between a weight ratio of a cathode material to an anode material, a weight ratio of metallic lithium to the anode material and an initial discharge capacity, a discharge capacity deterioration amount.
Figure 3:
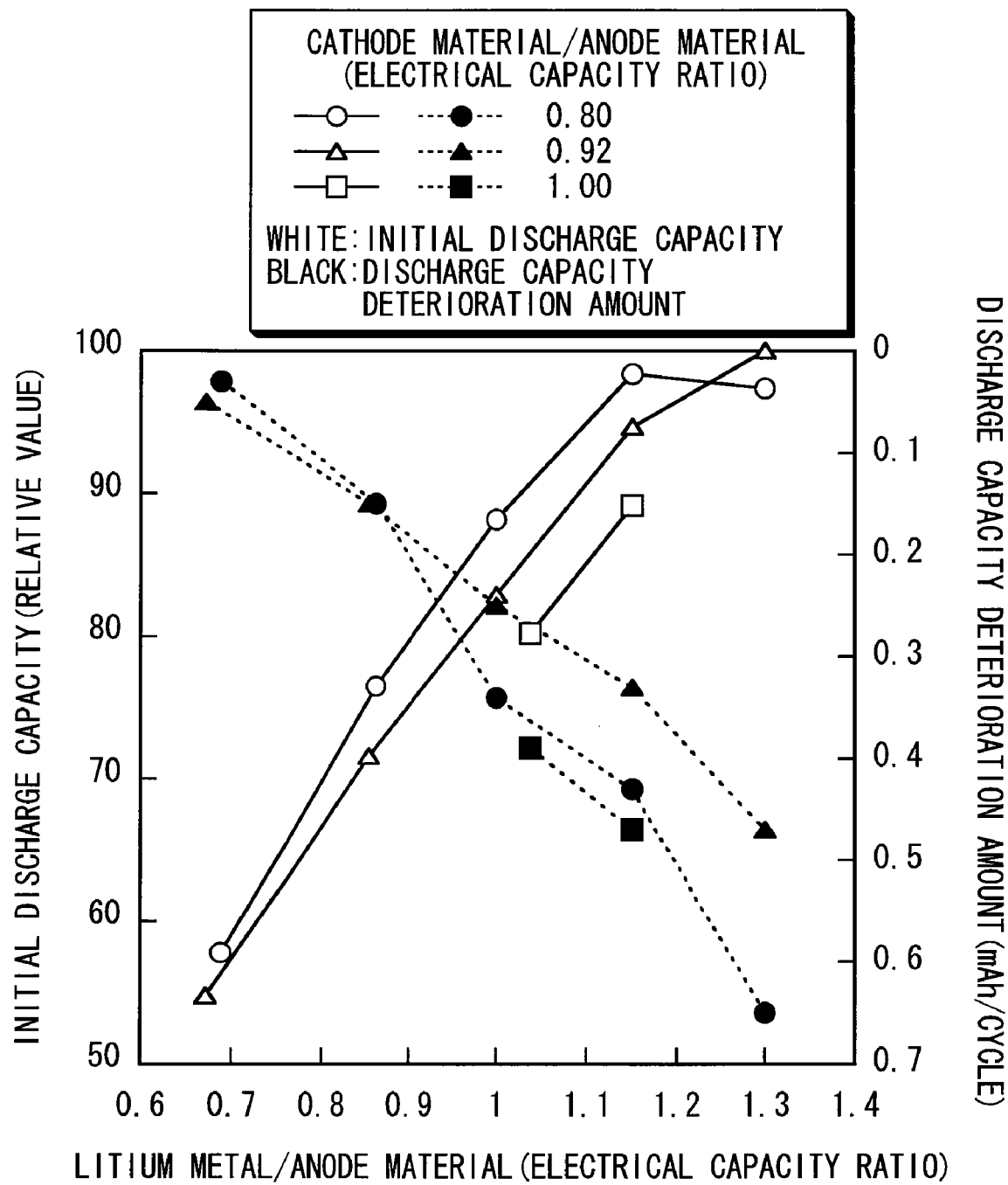
FIG. 3 is a characteristics view showing a relation between an electrical capacity ratio of a cathode to an anode, an electrical capacity ratio of metallic lithium to the anode and an initial discharge capacity, a discharge capacity deterioration amount.

As evidenced by Tables 1, 2 and FIGS. 2, 3, for example, in the case that the electrical capacity ratio of metallic lithium to the anode 14 was about 1, when the electrical capacity ratio of the cathode 12 to the anode 14 became small, the initial discharge capacity was improved, while even when the electrical capacity ratio of the cathode 12 to the anode 14 was small, the discharge capacity deterioration amount was increased. Further, the initial discharge capacity was increased as the weight ratio of metallic lithium to the anode material or the electrical capacity ratio of metallic lithium to the anode 14 was increased. Meanwhile, the deterioration amount of the discharge capacity was increased as the weight ratio of metallic lithium to the anode material or the electrical capacity ratio of metallic lithium to the anode 14 was increased.

That is, it was found that when the weight ratio of the cathode material to the anode material was in the range from 2.03 to 2.53, or the electrical capacity ratio of the cathode 12 to the anode 14 was in the range from 0.8 to 1.0, the capacity and the cycle characteristics could be improved. Further, it was found that the weight ratio of metallic lithium to the anode material was desirably in the range from 0.058 to 0.11, more desirably in the range from 0.07 to 0.10, and much more desirably in the range from 0.073 to 0.098. Further, it was found that the electrical capacity ratio of metallic lithium to the anode 14 was desirably in the range from 0.67 to 1.30, more desirably in the range from 0.8 to 1.2, and much more desirably in the range from 0.86 to 1.15.

Examples 4-1 to 4-3

Secondary batteries were fabricated as in Example 2-3, except that the concentration of lithium perchlorate in the electrolytic solution was 0.6 mol/l, 1.0 mol/l, or 1.5 mol/l. The weight ratio of the cathode material to the anode material was 2.33, and the weight ratio of metallic lithium to the anode material was 0.085. Further, the mixing ratio (volume ratio) of ethylene carbonate, dimethyl carbonate, and methyl ethyl carbonate was ethylene carbonate:dimethyl carbonate:methyl ethyl carbonate=18:72:10.

For the secondary batteries of Examples 4-1 to 4.3, the initial discharge capacity at 23 deg C. or −20 deg C. and the discharge capacity deterioration amount were examined. The initial discharge capacity at 23 deg C. and the discharge capacity deterioration amount were examined as in Examples 1-1 to 1-5, 2-1 to 2-5, 3-1, and 3-2. Further, the initial discharge capacity at −20 deg C. was the discharge capacity when constant current discharge was performed until the battery voltage reached 2.0 V at a constant current of 0.5 mA at −20 deg C. The results are shown in Table 3. In Table 3, each initial discharge capacity is shown as a relative value where the value of the initial discharge capacity at 23 deg C. of Example 2-5 is 100.

TABLE 3

|  | $LiClO_4$ concentration (mol/l) | Initial discharge capacity at 23 deg C. (relative value) | Initial discharge capacity at −20 deg C. (relative value) | Discharge capacity deterioration amount at 23 deg C. (mAh/cycle) |
|---|---|---|---|---|
| Example 4-1 | 0.6 | 81.8 | 4.5 | 0.19 |
| Example 4-2 | 1.0 | 82.9 | 72.9 | 0.23 |
| Example 2-3 | 1.4 | 82.9 | 73.4 | 0.25 |
| Example 4-3 | 1.5 | 82.9 | 72.9 | 0.27 |

As evidenced by Table 3, the initial discharge capacity at 23 deg C. was increased as the concentration of lithium perchlorate was increased, and then showed the constant value. Further, the initial discharge capacity at −20 deg C. was increased as the concentration of lithium perchlorate was increased, showed the maximum value, and then was decreased. Furthermore, the deterioration amount of the discharge capacity was increased as the concentration of lithium perchlorate was increased.

That is, it was found that the concentration of lithium perchlorate in the electrolytic solution was preferably in the range from 0.6 mol/I to 1.5 mol/l, and more preferably in the range from 1.0 mol/l to 1.5 mol/l.

Example 5-1

A secondary battery was fabricated as in Example 2-3, except that vinylene carbonate was added to the electrolytic solution, that is, an electrolytic solution in which lithium perchlorate ($LiClO_4$) as an electrolyte salt was dissolved in a mixed solvent of ethylene carbonate, dimethyl carbonate, methyl ethyl carbonate, and vinylene carbonate was used. Then, the content of vinylene carbonate in the electrolytic solution was 1 wt %. The mixing ratio (volume ratio) of ethylene carbonate, dimethyl carbonate, and methyl ethyl carbonate was ethylene carbonate:dimethyl carbonate:methyl ethyl carbonate=18:72:10. The concentration of lithium perchlorate in the electrolytic solution was 1.4 mol/l. The weight ratio of the cathode material to the anode material was 2.33, and the weight ratio of metallic lithium to the anode material was 0.085.

For the secondary battery of Example 5-1, the discharge capacity deterioration amount was examined as in Examples 1-1 to 1-5, 2-1 to 2-5, 3-1, and 3-2. The result was shown together with the result of Example 2-3 in Table 4.

TABLE 4

|  | Vinylene carbonate | Discharge capacity deterioration amount (mAh/cycle) |
| --- | --- | --- |
| Example 5-1 | Present | 0.09 |
| Example 2-3 | Not present | 0.25 |

As evidenced by Table 4, according to Example 5-1, in which vinylene carbonate was contained in the electrolytic solution, the deterioration amount of discharge capacity was smaller than in Example 2-3, in which vinylene carbonate was not contained.

That is, it was found that when vinylene carbonate was contained in the electrolytic solution, the cycle characteristics could be further improved.

Examples 6-1 to 6-4

Secondary batteries were fabricated as in Examples 1-1 to 1-5, 2-1 to 2-5, 3-1, and 3-2, except that an electrolytic solution in which lithium perchlorate (LiClO$_4$) as an electrolyte salt was dissolved in a mixed solvent of ethylene carbonate, dimethyl carbonate, methyl ethyl carbonate, and vinylene carbonate was used. Then, the content of vinylene carbonate in the electrolytic solution was changed in the range from 0 wt % to 1.5 wt %. The mixing ratio (volume ratio) of ethylene carbonate, dimethyl carbonate, and methyl ethyl carbonate was ethylene carbonate:dimethyl carbonate:methyl ethyl carbonate=18:72:10. Further, the concentration of lithium perchlorate was 1.4 mol/l. Furthermore, the cathode 12 was discoid being 4.2 mm in external diameter Φ and 1.1 mm thick. The anode 14 was discoid being 4.6 mm in external diameter Φ and 0.5 mm thick. The lithium metal foil was discoid being 4.0 mm in external diameter Φ and 0.15 mm thick. The coin-type secondary battery was 6.8 mm in external diameter Φ and 2.1 mm thick. In addition, the weight ratio of the cathode material to the anode material was 2.33, and the weight ratio of metallic lithium to the anode material was 0.085.

For the secondary batteries of Examples 6-1 to 6-4, the initial discharge capacity at 23 deg C. or −20 deg C. was examined as in Examples 1-1 to 1-5, 2-1 to 2-5, 3-1, 3-2, and 4-1 to 4-3. The results are shown in Table 5. In Table 5, each initial discharge capacity is shown as a relative value where the value of the initial discharge capacity at 23 deg C. of Example 6-1 is 100.

TABLE 5

|  | Content of vinylene carbonate (wt %) | Initial discharge capacity at 23 deg C. (relative value) | Initial discharge capacity at −20 deg C. (relative value) |
| --- | --- | --- | --- |
| Example 6-1 | 0 | 100 | 92.8 |
| Example 6-2 | 0.5 | 105.2 | 99.3 |
| Example 6-3 | 1.0 | 106.2 | 105.9 |
| Example 6-4 | 1.5 | 105.2 | 98.7 |

As evidenced by Table 5, according to Examples 6-2 to 6-4, in which vinylene carbonate was contained in the range of 1.5 wt % or less, the initial discharge capacity was higher than in Example 6-1, in which vinylene carbonate was not contained.

That is, it was found that the content of vinylene carbonate in the electrolytic solution was preferably in the range of 1.5 wt % or less.

The present invention has been described with reference to the embodiment and the examples. However, the present invention is not limited to the embodiment and the examples, and various modifications may be made. For example, in the foregoing embodiment and examples, descriptions have been given of the case using the liquid electrolytic solution. However, instead of the electrolytic solution, a gelatinous electrolyte or a solid electrolyte may be used. The gelatinous electrolyte is an electrolyte in which an electrolytic solution is held by, for example, a high molecular weight compound. The electrolytic solution is as described above. Any high molecular weight compound may be used as long as the high molecular weight compound absorbs and gelates the electrolytic solution. As such a high molecular weight compound, for example, a fluorinated high molecular weight compound such as polyvinylidene fluoride and a copolymer of vinylidene fluoride and hexafluoropropylene; an ether high molecular weight compound such as polyethylene oxide and a cross-linked body containing polyethylene oxide; polyacrylonitrile or the like can be cited. In particular, in view of redox stability, the fluorinated high molecular weight compound is desirable.

For the solid electrolyte, for example, either an inorganic solid electrolyte or a high molecular weight solid electrolyte may be used as long as the electrolyte is a material having lithium ion conductivity. As an inorganic solid electrolyte, a substance containing lithium nitride, lithium iodide or the like can be cited. The high molecular weight solid electrolyte is mainly made of an electrolyte salt and a high molecular weight compound dissolving the electrolyte salt. As a high molecular weight compound of the high molecular weight solid electrolyte, for example, an ether high molecular weight compound such as polyethylene oxide and a cross-linked body containing polyethylene oxide, an ester high molecular weight compound such as poly methacrylate, or an acrylate high molecular weight compound can be used singly, by mixing, or by copolymerization. When such a solid electrolyte is used, the separator may be removed.

Further, in the foregoing embodiment and examples, descriptions have been given of the coin-type secondary battery with a specific example. However, the present invention can be similarly applied to a secondary battery having other shape such as a cylinder and a square with other structure, or a secondary battery having other structure such as a winding structure.

It should be understood by those skilled in the art that various modifications, combinations, sub-combinations and alternations may occur depending on design requirements and other factors insofar as they are within the scope of the appended claims or the equivalents thereof.

What is claimed is:

1. A coin-shaped battery comprising:
a cathode can;
a discoid cathode within the cathode can;
an anode can;
a discoid anode on the lithium metal foil within the anode can;
a discoid lithium metal foil between the anode and the cathode can;
a separator directly between the anode and the cathode; and
an electrolyte including $LiClO_4$ and a solvent containing ethylene carbonate, dimethyl carbonate, and methyl ethyl carbonate injected therein
wherein,
an open circuit voltage in full charge state per a pair of cathode and anode is in the range from 2.9 V to 3.2 V,
the cathode contains $Li_4Mn_5O_{12}$ material capable of inserting and extracting lithium,
the anode contains a graphite material capable inserting and extracting lithium,
a weight ratio of the cathode material to the anode material is in the range from 2.03 to 2.53, and
a weight ratio of all of the lithium metal incorporated inside of the battery to the anode is in the range from 0.058 to 0.11.

2. The battery according to claim 1, wherein the cathode material contains an oxide containing lithium and manganese.

3. The battery according to claim 1, wherein the anode material contains a carbon material.

4. The battery according to claim 1, wherein the electrolyte contains lithium perchlorate in the range from 0.6 mol/l to 1.5 mol/l.

5. The battery according to claim 1, wherein the electrolyte contains vinylene carbonate in the range of 1.5 wt % or less.

6. The battery according to claim 1, wherein an electrical capacity ratio of the cathode to the anode (cathode/anode) is in the range from 0.8 to 1.0.

7. The battery according to claim 1, wherein an electrical capacity ratio of all of the lithium metal to the anode is in the range from 0.67 to 1.3.

8. A coin-shaped battery comprising:
a cathode can;
a discoid cathode within the cathode can;
an anode can;
a discoid anode within the anode can;
a discoid lithium metal film between the anode and the anode can;
a separator directly between the anode and the cathode; and
an electrolyte, including $LiClO_4$ and a solvent containing ethylene carbonate, dimethyl carbonate, and methyl ethyl carbonate injected therein
wherein,
an open circuit voltage in full charge state per a pair of cathode and anode is in the range from 2.9 V to 3.2 V,
the cathode contains a $Li_4Mn_5O_{12}$ material capable of inserting and extracting lithium,
the anode contains a graphite material capable of inserting and extracting lithium,
an electrical capacity ratio of the cathode to the anode is in the range from 0.8 to 1.0, and
an electrical capacity ratio of all of the lithium metal incorporated inside the battery to the anode is in the range from 0.67 to 1.3.

9. The battery according to claim 8, wherein the cathode material contains an oxide containing lithium and manganese.

10. The battery according to claim 8, wherein the anode material contains a carbon material.

11. The battery according to claim 8, wherein the electrolyte contains lithium perchlorate in the range from 0.6 mol/l to 1.5 mol/l.

12. The battery according to claim 8, wherein the electrolyte contains vinylene carbonate in the range of 1.5 wt % or less.

* * * * *